United States Patent
Omae et al.

(10) Patent No.: US 6,455,191 B2
(45) Date of Patent: Sep. 24, 2002

(54) CONNECTING PART FOR CONNECTING INTERNAL COMPONENTS OF LEAD ACID BATTERY

(75) Inventors: Takao Omae; Hiroyuki Ishiguro, both of Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/903,482

(22) Filed: Jul. 12, 2001

(30) Foreign Application Priority Data

Jul. 12, 2000 (JP) ........................... 2000-210904
Mar. 30, 2001 (JP) ........................... 2001-098047

(51) Int. Cl.⁷ .................. H01M 4/66; H01M 2/20; H01M 2/30
(52) U.S. Cl. ........................... 429/160; 429/245
(58) Field of Search ................ 429/160, 161, 429/238, 245

(56) References Cited

U.S. PATENT DOCUMENTS

| | | | | |
|---|---|---|---|---|
| 4,107,407 A | * | 8/1978 | Koch | 429/225 |
| 4,332,629 A | * | 6/1982 | McWhinnie | 148/11.5 |
| 4,456,579 A | * | 6/1984 | Rao | 420/566 |
| 4,753,688 A | * | 6/1988 | Myers | 148/11.5 |
| 5,169,734 A | * | 12/1992 | Rao | 429/160 |
| 5,462,109 A | * | 10/1995 | Vincze | 164/479 |
| 5,650,242 A | * | 7/1997 | Rao | 429/161 |
| 5,691,087 A | * | 11/1997 | Rao | 429/245 |
| 5,874,186 A | * | 2/1999 | Rao | 429/242 |

FOREIGN PATENT DOCUMENTS

| | | | | |
|---|---|---|---|---|
| AU | 9477428 A | * | 5/1995 | H01M/4/68 |
| CA | 1162424 | * | 2/1984 | H01M/4/13 |
| GB | 2058836 A | * | 4/1981 | H01M/4/73 |

* cited by examiner

Primary Examiner—Patrick Ryan
Assistant Examiner—Mark Ruthkosky
(74) Attorney, Agent, or Firm—Sughrue Mion, PLLC

(57) ABSTRACT

The use of the Pb—Sn alloy containing Ag and Se of the present invention as a connecting part for connecting internal components makes it possible to improve the resistance of straps, poles and cell connectors to general corrosion and grain boundary corrosion, inhibit the occurrence of the stress corrosion cracking and enhance the alloy strength, thus providing a lead acid battery having an excellent reliability.

9 Claims, 2 Drawing Sheets

CONNECTING PART FOR CONNECTING INTERNAL COMPONENTS OF LEAD ACID BATTERY

FIELD OF THE INVENTION

The present invention relates to improvement in the corrosion resistance of a connecting part for connecting internal components of a lead acid battery.

BACKGROUND ART

As the connecting parts for connecting internal components of lead acid batteries such as the strap and the pole, a Pb—Sb alloy containing Sb in an amount of from 2.0 to 4.0% by weight or a Pb—Sn alloy containing Sn in an amount of from 1.0 to 5.0% by weight has been used hitherto. Among these alloys, the Pb—Sn alloy has been mainly used as the connecting part for valve regulated lead acid batteries having a limited amount of electrolyte. This is because Sb causes an adverse effect when it enters into the battery.

The Pb—Sn alloy is a typical eutectic alloy. A Pb—Sn alloy containing Sn in an amount of about 3.0% by weight is formed by lead-rich primary crystals and a crystal structure comprising Sn-rich phase deposited at the grain boundary between the primary crystals. Thus, the Pb—Sn alloy having the foregoing composition can have their primary crystals to grow to a large size. Since the Sn-rich phase deposited at the crystal boundary has a low strength, a cavity (crack) could be produced in the grain boundary at the solidification step.

In the valve regulated lead acid battery, the connecting part for connecting internal components could be corroded. This is attributed to the following oxygen reduction reaction involving the reduction of oxygen gas produced at the positive electrode on a lead part:

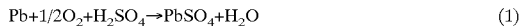

$$Pb+1/2O_2+H_2SO_4 \rightarrow PbSO_4+H_2O \qquad (1)$$

Since such a lead part is exposed to the exterior of the electrolytic solution, it does not undergo charge-discharge reaction as occurring in the part soaked in the electrolytic solution. Thus, once converted to lead sulfate ($PbSO_4$), this lead part cannot be converted back to lead (Pb). Therefore, the oxygen reduction reaction represented by the foregoing equation (1) causes general corrosion which is uniform corrosion of the surface of the lead part.

In the Pb—Sn alloy, Sn-rich phase deposited at the grain boundary can be easily corroded, causing corrosion to proceed along the grain boundary (grain boundary corrosion). Further, the Pb—Sn alloy is subject to stress developed by the volumetric change of corrosion products that causes the grain boundary to be cracked (stress corrosion cracking). In the worst case, the connecting part would be broken.

As an approach for overcoming the problem that grain boundary corrosion can easily occur due to the growing of crystals of Pb—Sn alloy, there is proposed a method of adding Se, Te, etc. to a Pb—Sn alloy in an unexamined published Japanese patent application No. 9-167611. This method is to add a nucleant such as Se to a Pb—Sn alloy in order to make grains fine and hence solve the problem of grain boundary corrosion and stress corrosion cracking.

However, it was found that even the Pb—Sn alloy comprising the nucleant such as Se has the following problems. That is to say, the alloy comprising finely divided crystal particles is little subject to the progress of grain boundary corrosion but cannot be prevented from general corrosion due to the oxygen reduction reaction. Thus, such a lead part gradually causes reducing in thickness during use in a valve regulated lead acid battery.

Further, a cell connector made of a Pb—Sn alloy comprising large crystals undergoes grain boundary corrosion along the area at which the cell connector is connected, sometimes causing the connecting part to break due to vibration or impact during use. This fracture occurs along the connecting area (final solidification interface). Therefore, this fracture is presumably attributed to the facts that the final solidification interface can easily have an Sn-rich phase thereon and thus can be easily corroded, this Sn-rich phase has a low strength and thus is brittle, and the cell connector is subject to tensile or shearing stress on the connecting area due to vibration, impact or the like. This problem can also occur with a Pb—Sn alloy comprising fine grains including Se or the like incorporated therein. Thus, by this alloy, the strength of final solidification interface has not sufficiently improved.

Accordingly, it has therefore been a great requirement that the Pb—Sn alloy to be used in the connecting part for connecting internal components of a lead acid battery be prevented from grain boundary corrosion, be less subject to general corrosion and have an enhanced strength in itself and a connecting area.

SUMMARY OF THE INVENTION

The present invention has the following embodiments.

(1) A connecting part for connecting internal components of a lead acid battery, which comprises a Pb—Sn alloy containing Ag and Se.

(2) The connecting part for connecting internal components of a lead acid battery according to (1) above, wherein the content of Ag is from 0.01 to 1.0% by weight based on the weight of Pb.

(3) The connecting part for connecting internal components of a lead acid battery according to (1) or (2) above, wherein the content of Se is from 0.001 to 0.05% by weight based on the weight of Pb.

(4) The connecting part for connecting internal components of a lead acid battery according to any one of (1) to (3) above, wherein the content of Sn is from 0.5 to 5.0% by weight based on the weight of Pb.

(5) The connecting part for connecting internal components of a lead acid battery according to any one of (1) to (4) above, which is a strap.

(6) The connecting part for connecting internal components of a lead acid battery according to any one of (1) to (4) above, which is a pole.

(7) The connecting part for connecting internal components of a lead acid battery according to any one of (1) to (4) above, which is a cell connector.

(8) A lead acid battery comprising a connecting part for connecting internal components according to any one of (1) to (7) above.

The first embodiment of implication of the present invention is characterized in that a lead acid battery has a connecting part for connecting internal components comprising a Pb—Sn alloy containing Ag and Se.

In accordance with the present invention, the connecting part for connecting internal components has an enhanced resistance to general corrosion (resistance to conversion to lead sulfate). At the same time, the crystal particles of the lead alloy can be finely divided to disperse Sn-rich phase deposited at the grain boundary, making it possible to improve the resistance to grain boundary corrosion. Further, the enhancement of resistance to grain boundary corrosion can be accompanied by the prevention of the stress corrosion cracking. Moreover, the strength of the alloy can be enhanced, and the castability and weldability of the alloy can be improved.

The present invention is also characterized in that a Pb—Sn alloy to be used in connecting parts for connecting internal components contains Ag and Se in an amount of from 0.01 to 1.0% by weight, and from 0.001 to 0.05% by weight, and Sn from 0.5 to 5.0% by weight, respectively.

Further, the arrangement that the content of Ag, Se and Sn in the Pb—Sn alloy containing Ag and Se fall within the above defined range makes it possible to remarkably enhance both of general corrosion resistance and grain boundary corrosion resistance and hence obtain a high alloy strength. Moreover, in order to exert a more sufficient effect of improving general corrosion resistance, it is more preferred that the content of Ag and Se be from 0.02 to 1.0% by weight and from 0.005 to 0.05% by weight, respectively.

BRIEF DESCRIPTION OF THE INVENTION

DETAILED DESCRIPTION OF THE INVENTION

Figure 1:
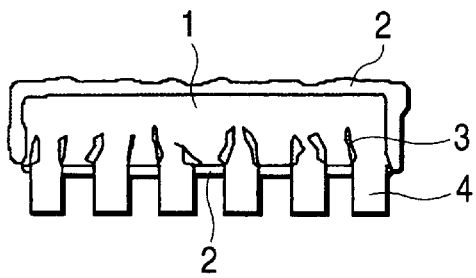
FIG. 1 is a schematic diagram illustrating a section of a corroded strap.

In the present invention, the connecting part for connecting internal components is not specifically limited as long as it exists partly or entirely in the lead acid battery and is a component or member other than positive and negative electrodes to be used in the assembly of the lead acid battery. Examples of the connecting part for connecting internal components include strap, strap-forming additive lead (burning rod), pole, and cell connector. Examples of the cell connector include through the partition type cell connector, and over the partition type cell connector.

In the present invention, the process for the preparation of the alloy to be used as a connecting part for connecting internal components is not specifically limited. Any ordinary casting process for the preparation of an alloy may be utilized to prepare the alloy. The process for forming the alloy into a connecting part for connecting internal components is not specifically limited as long as the alloy thus prepared can be formed into a connecting part for connecting internal components having a predetermined shape.

The process for the preparation of a lead acid battery from the connecting part for connecting internal components of the invention is not specifically limited. Any ordinary preparation process for use in the preparation of a lead acid battery may be utilized to prepare the lead acid battery of the invention.

Embodiment of the present invention will be further described with reference to a lead acid battery comprising Pb—Sn alloys having different Ag contents and Se contents as connecting parts for connecting internal components as examples. The term "% by weight" as used herein is synonymous with "% by mass".

EXAMPLE 1

Alloys comprising Pb—1.0 wt % Sn alloy as a base and containing Ag and Se in various amounts of from 0 to 2.0% by weight and from 0 to 0.05% by weight, respectively, were prepared as the connecting part for connecting internal components of a lead acid battery.

Since the solubility of Se in a lead alloy depends on the temperature, Se can be added only up to a certain concentration in a commonly used alloy preparation temperature range. Accordingly, the upper limit of the added amount of Se was made to be 0.05% by weight.

These alloys were each used to prepare a strap, a pole and a cell connector, which were then assembled to a 12V 20 Ah absorptive grass mat-type valve regulated lead acid battery. As a battery element there was used a battery element having an ordinary structure obtained by stacking positive and negative electrodes having a Pb—Ca alloy grids pasted with active materials with fine glass fiber separators interposed therebetween.

The sample alloys were each used to prepare a cell connector. While the sample alloy having the same composition as that used for pole and cell connector was being melted by a gas burner and supplied, the electrode tabs and the cell connectors were melted and solidified to form a strap. The thickness of the strap was 5 mm. Subsequently, the elements were inserted into a polypropylene battery case. The cell connectors were then connected by electrical resistance welding. Then, an absorptive grass mat-type valve regulated lead acid battery was assembled.

In order to evaluate the connecting part for connecting internal components, these batteries were respectively subjected to the floating charge test. This test was carried out at a temperature of 60° C. and a floating charge voltage of 13.65 V for 10 months. The batteries thus tested were each disassembled. The components were then withdrawn for the examination of corrosion.

In batteries which showed much corrosion, the strap, pole and cell connector were all found corroded. As a representative portion to be examined, a cross section of the strap was observed for corrosion to compare the corrosion resistance of alloys. A typical cross section of the strap is shown in FIG. 1. There are observed a general corrosion layer 2 which has grown relatively uniformly and a grain boundary corrosion 3 which proceeds deeply along the crystal grain boundaries. In the Figure, the reference numeral 1 indicates a strap, and the reference numeral 4 indicates an electrode tab. The evaluation of sample alloy was carried out by the measurement of the thickness of the general corrosion layer 2 and the depth of progress of corrosion in the grain boundary corrosion 3.

Figure 2:
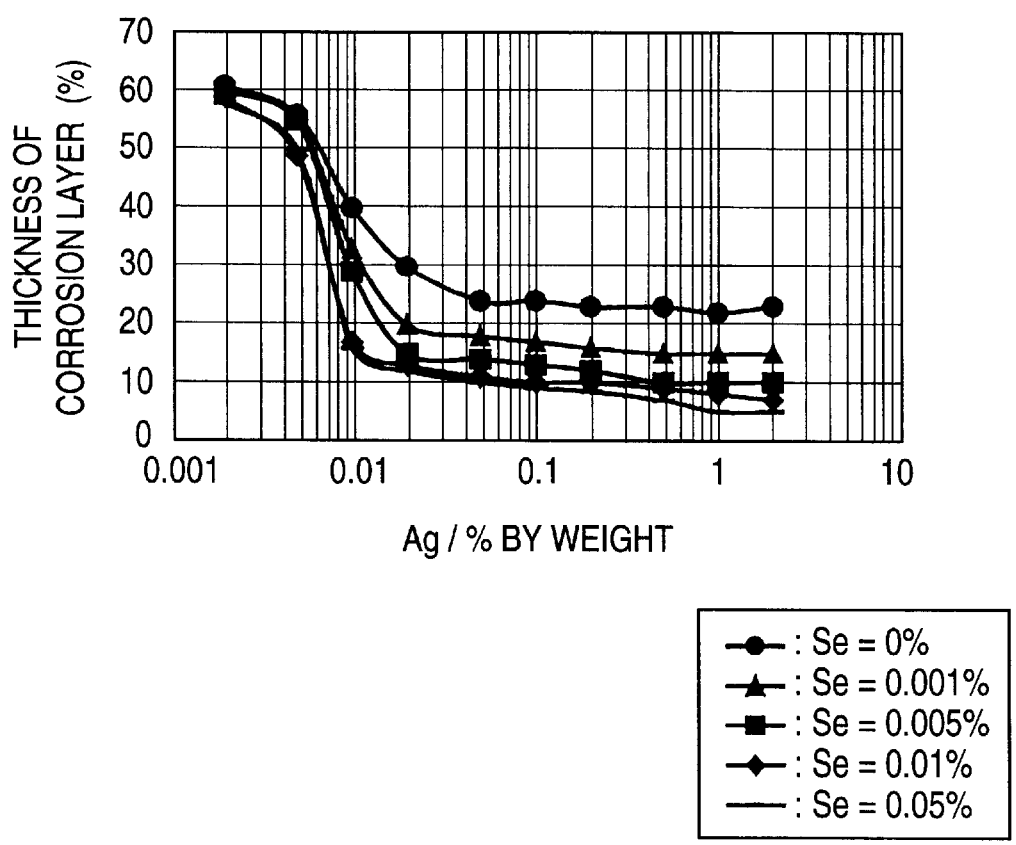
FIG. 2 is a diagram illustrating the relationship between the content of Ag and the thickness of the generally corroded layer.

FIG. 2 shows the results of measurement of the thickness of the general corrosion layer. The results are plotted with the content of Ag as the abscissa and the ratio of the thickness of the corrosion layer to the initial thickness of the strap as the ordinate. In order to determine the thickness of the corrosion layer, the measurements obtained at five points on the surface of the strap were averaged.

When the content of Ag exceeds 0.005% by weight, the thickness of the general corrosion layer tends to show a sudden drop. However, when the content of Ag is not smaller than 0.05% by weight, as the content of Ag increases, the thickness of the corrosion layer decreases gradually but not so remarkably. FIG. 2 shows the results measured at the Ag content of 0.002% by weight or more. The results obtained when no Ag was added were almost the same with the results obtained when the amount of Ag was 0.002% by weight.

The alloys having Se incorporated therein showed much less general corrosion than those free of Se when the content of Ag is not smaller than 0.01% by weight. This presumably means that the effect of inhibiting general corrosion exerted by the incorporation of Ag is synergistically accelerated by the incorporation of Se. However, when the content of Se exceeds 0.01% by weight, the resulting effect of inhibiting general corrosion tends to be lessened.

From the standpoint of improvement of resistance to general corrosion, the Pb—Sn alloy containing both Ag and Se is useful when the content of Ag is from 0.01 to 1.0% by weight. Preferably, the alloy contains Se in an amount of from 0.001 to 0.05% by weight. More preferably, it is considered that the alloy contains Ag and Se in an amount of from 0.02 to 1.0% by weight and from 0.005 to 0.05% by weight, respectively.

Figure 3:
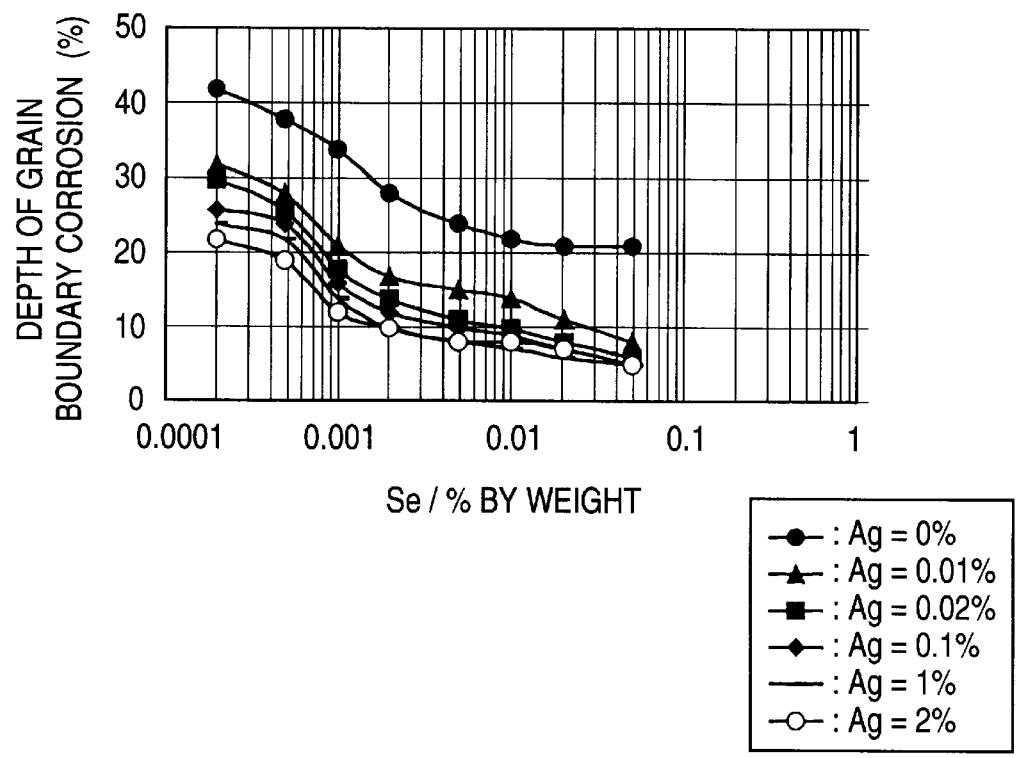
FIG. 3 is a graph illustrating the relationship between the content of Se and the depth of progress of grain boundary corrosion.

FIG. 3 illustrates the results of measurement of the depth of progress of grain boundary corrosion. The results are plotted with the content of Se as the abscissa and the ratio of the depth of progress of grain boundary corrosion to the initial thickness of the strap as the ordinate. The depth of progress of grain boundary corrosion is represented by the linear distance between the surface and the forward end of grain boundary corrosion which shows the deepest progress toward the interior of the strap.

The depth of progress of grain boundary corrosion tends to decrease with the rise of the content of Se. It was found that the depth of progress of grain boundary corrosion decreases remarkably when the content of Se is not smaller than 0.001% by weight and decreases gradually until the content of Se reaches 0.05% by weight.

It was further found that by merely adding Ag in an amount of not smaller than 0.01% by weight, the depth of progress of grain boundary corrosion shows a remarkable drop as compared with the alloys free of Ag. This presumably means that the effect of inhibiting grain boundary corrosion exerted by the incorporation of Se is synergistically accelerated by the incorporation of Ag. The more the content of Ag is, the less is the depth of progress of grain boundary corrosion. However, when the content of Ag is not smaller than 1%, the tendency for decrease of depth of progress of grain boundary corrosion is lessened.

From the standpoint of improvement of resistance to grain boundary corrosion, the Pb—Sn alloy containing both Ag and Se preferably contains Se in an amount of from 0.001 to 0.05% by weight as well as Ag in an amount of from 0.01 to 1.0% by weight.

The reason why the incorporation of Ag causes the drop of amount of general corrosion is unknown. However, the following reason can be roughly proposed. As previously mentioned, the corrosion of lead alloys in the valve regulated lead acid battery presumably involves the reaction of oxygen produced on the positive electrode with a lead alloy and sulfuric acid leading to the production of lead sulfate and water, which is oxygen-reduction reaction represented by the scheme (1). Ag acts as a catalyst in the reduction of oxygen to cause a reaction represented by the following scheme (2) by which oxygen is directly reduced to water and thus is consumed. As a result, general corrosion due to the oxygen-reduction reaction represented by the scheme (1) is lessened.

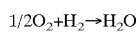
(2)

It has heretofore been said that the effect of Se on the improvement of resistance to grain boundary corrosion is attributed to the fact that Se acts to make the crystal structure fine and hence disperse Sn-rich phase deposited on the grain boundaries. As can be seen in the results of test, the incorporation of Ag in addition to Se exerts an unexpectedly great synergistic effect of improving resistance to both grain boundary corrosion and general corrosion. It can be thought that Ag exerts a catalytic oxygen reduction effect to accelerate the effect of inhibiting grain boundary corrosion exerted by the incorporation of Se and a good synergistic effect on the inhibition of progress of general corrosion accompanying the fine grains by the incorporation of Se.

In addition to the strap, the pole and cell connector were observed. The results were similar to that of the strap.

EXAMPLE 2

The effect of the content of Sn was examined. As the sample metals there were prepared alloys comprising as a base a Pb—Sn alloy containing Ag and Se in an amount of 0.1% by weight and 0.02% by weight, respectively, and Sn in an amount of from 0 to 7.0% by weight. These sample alloys were each used to prepare a connecting part for connecting internal components. Using these connecting parts, a battery was assembled in the same manner as in Example 1, and subjected to the floating charge test in the same manner as in Example 1.

When the content of Sn fell below 0.5% by weight, the size of crystal increased, the effect of Se to make the crystal structure fine was not found, and the strap thus tested showed grain boundary corrosion deep therein. On the other hand, when the content of Sn exceeded 5% by weight, the alloys exhibited deteriorated general corrosion resistance that increased the thickness of the corrosion layer. These results show that the effect of the present invention can be well exerted when the range of the content of Sn in the Pb—Sn alloy is from 0.5 to 5.0% by weight.

EXAMPLE 3

The strength of alloys containing Ag and Se incorporated therein was examined. For this test, a pair of cell connectors prepared from the foregoing alloys was disposed on both sides of a synthetic resin plate having a hole with a diameter of 8 mm formed therein. The two cell connectors were then connected to each other by the electrical resistance welding method. The shear fracture force required to twist off the cell connectors at the connecting portion when the connecting portion is under the application of a rotational force (shearing stress) was measured.

Figure 4:
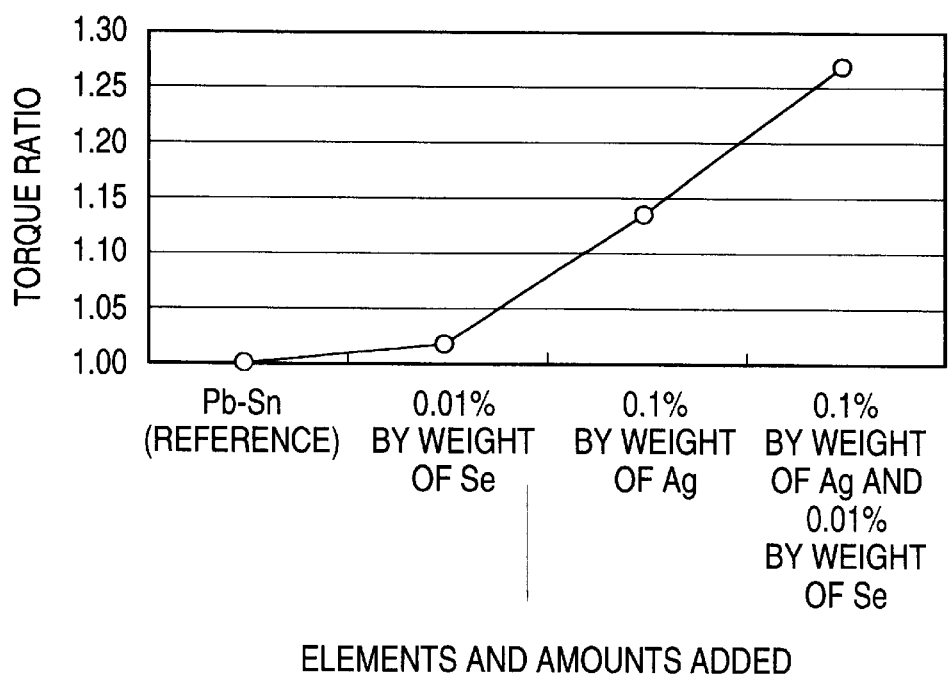
FIG. 4 is a diagram illustrating the difference in shear fracture force among different types of alloys.

FIG. 4 illustrates the results of the measurement of shear fracture force versus the kind of the alloys tested (content of Ag and Se in the alloys). The breaking torque ratio in the ordinate in the Figure indicates the ratio of shear fracture force at the connecting portion on the various alloys to that at the connecting portion on the Pb—Sn alloy free of Ag and Se.

The Pb—Sn alloy containing 0.01% by weight of Se showed no great improvement of ratio of breaking torque as compared with the Pb—Sn alloy free of Ag and Se. However, the alloy containing 0.1% by weight of Ag showed a breaking torque ratio rise of about 14%. Further, the alloy containing both 0.1% by weight of Ag and 0.01% by weight of Se showed a breaking torque ratio rise of about 27%. It can thus been seen that while the single addition of Se does not make much contribution to the enhancement of strength, the addition of both Ag and Se makes it possible to drastically enhance the strength at the connecting portion on the alloy.

The reason for this enhancement of strength is not well known. However, it is thought that by adding Ag or Ag and Se in combination, the brittleness of Sn-rich phase deposited at grain boundaries can be overcome, making it possible to remarkably enhance the strength at the connecting portion on the alloy.

The use of the Pb—Sn alloy containing Ag and Se of the present invention as a connecting part for connecting internal components makes it possible to improve the resistance of straps, poles and cell connectors to general corrosion and grain boundary corrosion, inhibit the occurrence of the stress corrosion cracking and enhance the alloy strength, thus providing a lead acid battery having an excellent reliability.

While the invention has been described in detail and with reference to specific embodiments thereof, it will be apparent to one skilled in the art that various changes and modifications can be made therein without departing from the spirit and scope thereof.

This application is based on Japanese patent applications No. 2000-210904 filed on Jul. 12, 2000 and No. 2001-098047 filed on Mar. 30, 2001, the entire contents thereof being hereby incorporated by reference.

What is claimed is:

1. A connecting part for connecting internal components of a lead acid battery, which comprises a Pb—Sn alloy consisting essentially of Pb, Sn, Ag and Se.

2. The connecting part for connecting internal components of a lead acid battery according to claim 1, wherein the content of Ag is from 0.01 to 1.0% by weight based on the weight of Pb, the content of Se is from 0.001 to 0.05% by weight based on the weight of Pb and the content of Sn is from 0.5 to 5.0% by weight based on the weight of Pb.

3. The connecting part for connecting internal components of a lead acid battery according to claim 1, which is a strap.

4. The connecting part for connecting internal components of a lead acid battery according to claim 2, which is a strap.

5. The connecting part for connecting internal components of a lead acid battery according to claim 1, which is a pole.

6. The connecting part for connecting internal components of a lead acid battery according to claim 2, which is a pole.

7. The connecting part for connecting internal components of a lead acid battery according to claim 1, which is a cell connector.

8. The connecting part for connecting internal components of a lead acid battery according to claim 2, which is a cell connector.

9. A lead acid battery comprising a connecting part for connecting internal components according to any one of claims 1 to 8.

* * * * *